(12) United States Patent
Kinnunen et al.

(10) Patent No.: US 6,813,501 B2
(45) Date of Patent: Nov. 2, 2004

(54) LOCATION DEPENDENT SERVICES

(75) Inventors: Jari Kinnunen, Helsinki (FI);
Guruprasad Krishnamurthy, Espoo (FI); Karri Huhtanen, Tampere (FI); Pekka Jussila, Espoo (FI); Kalevi Ratschunas, Vantaa (FI)

(73) Assignee: Nokia Mobile Phones, Ltd., Espoo (FI)

( * ) Notice: Subject to any disclaimer, the term of this patent is extended or adjusted under 35 U.S.C. 154(b) by 450 days.

(21) Appl. No.: 09/794,284

(22) Filed: Feb. 27, 2001

(65) Prior Publication Data

US 2001/0018349 A1 Aug. 30, 2001

(30) Foreign Application Priority Data

Feb. 29, 2000 (FI) .......................................... 20000461

(51) Int. Cl.[7] .............................................. G01S 3/02
(52) U.S. Cl. .............................. 455/456.2; 455/456.5; 342/457
(58) Field of Search ........................... 455/456.5, 456.2; 342/457

(56) References Cited

U.S. PATENT DOCUMENTS

| | | | | |
|---|---|---|---|---|
| 5,959,580 A | * | 9/1999 | Maloney et al. | ............ 342/457 |
| 6,009,333 A | * | 12/1999 | Chaco | ..................... 455/456.5 |
| 6,108,555 A | * | 8/2000 | Maloney et al. | ......... 455/456.2 |
| 6,580,904 B2 | * | 6/2003 | Cox et al. | ................ 455/456.2 |

FOREIGN PATENT DOCUMENTS

| WO | WO 99/45732 | 9/1999 |
|---|---|---|
| WO | WO 99/56326 | 11/1999 |
| WO | WO 00/04730 | 1/2000 |

* cited by examiner

*Primary Examiner*—William Cumming
(74) *Attorney, Agent, or Firm*—Perman & Green, LLP

(57) ABSTRACT

A system for providing location dependent services to a plurality of mobile terminals within a coverage area. The system defines services deployment areas in which the services are available. A server receives, from a plurality of sources, location information indicating the locations of mobile terminals and tracks them so that their presence in particular service deployment areas can be determined. The services receive meta-information classifying the location information and use this meta-information to determine whether the source of the location information is reliable enough for the service to be provided. If it is reliable enough, the service is provided to the mobile terminal.

23 Claims, 7 Drawing Sheets

LOCATION DEPENDENT SERVICES

FIELD OF THE INVENTION

The present invention is related to the provision of location dependent services.

BACKGROUND OF THE INVENTION

A location dependent service (LDS) is provided only to service users within a particular location or area. Therefore, it is necessary to control access to such services based on the location of a user. In the case of mobile users, they may not be aware of services available in a particular location and so it is convenient to advertise the existence of the services to the user. Once a user has been made aware of a service, and has decided to activate it, a service application in the form of software might need to be downloaded into the user's terminal. Various forms of download can be used, for example Java.

Certain wireless communications systems are divided into a plurality of individual coverage areas, sometimes referred to as cells, which are served by individual base stations or access points. In such a cellular communications network, a cell can be several kilometers across. In systems such as the GSM (Global System for Mobile communications) system, mobile telephones are tracked so that the cell in which they are currently located (that is, the cell identity or cell ID) can be identified. This is necessary in routing telephone calls.

In the case of other wireless communications systems, for example a BLUETOOTH system or a wireless local area network (WLAN), the size of individual coverage areas can be in the regions of tens of metres. The size of the coverage areas may also depend on their environment, for example they may be confined to a single room or space in a building.

A terminal in a WLAN can request a service without requiring a physical connection to it. Therefore, it has been proposed that a terminal such as a lap top computer will be able to use a service, for example a printer, which is in its vicinity. This is one way to provide an LDS. In providing these services, service discovery mechanisms such as Service Location Protocol (SLP) and Jini have been proposed.

Systems are known which are used solely for determining location. Such a system is the Global Positioning System (GPS). It has been proposed to use a GPS receiver in mobile telephones in a mobile telecommunications network for location determination. This means that the mobile telephone can be located in the event of it making emergency calls. Alternatively it can be used to provide interactive map services, for example in a navigation system. In such a system, mobile terminals are tracked and provided with information to guide a user, typically the driver of an automobile, to reach a particular location.

As the sophistication of wireless communications networks and mobile terminals increases it has been proposed to include in wireless communications systems a variety of services which can be accessed by users. The services may be location independent, for example SMS messaging and communication over WAP, or location dependent, for example services which are only available when a mobile terminal is in a particular location. An example of LDS is presentation of discounted prices to a mobile terminal user in a shop. It is possible that LDSs may be confined to areas which are smaller than the size of a coverage area of the wireless communications network. Therefore, providing a LDS to all mobile terminals in a particular coverage area may provide it over too large an area. It has been proposed that LDSs may be provided by local access points within the wireless communications network. In this way, communications may be provided over base stations and services may be provided over local access points by a communication protocol such as BLUETOOTH or WLAN.

It has been proposed to track the location of mobile terminals by a positioning system such as GPS and to provide LDSs to the terminals when they are in proximity to a particular location.

It is becoming desirable to provide services from the Internet to mobile terminals such as mobile telephones.

SUMMARY OF THE INVENTION

According to a first aspect of the invention there is provided a system for providing services to at least one mobile terminal comprising:

an area containing a plurality of service locations to which services are associated, the mobile terminal being moveable within the area;

a plurality of location information sources to provide location information indicating the location of the mobile terminal;

a tracker for tracking the mobile terminal relative to the service locations so that the presence of the mobile terminal at a particular service location of a service can be determined;

a server for receiving the location information and determining whether location information from at least one source provides a basis for providing the service.

Preferably the system provides service to a plurality of mobile terminals.

The system may look at the available location information from the plurality of sources and determine that location information from one source provides the most suitable location information for a particular type of service. Using one particularly suitable type of location information provides better targeting of services.

Preferably the system applies to the location information a classification which indicates the reliability of the location information. Reliability of location information may refer to:

(i) functions making no error in obtaining, processing and forwarding location information;

(ii) its accuracy, for example its resolution; or (iii) its trustability, that is that it does indeed come from its purported source.

Reliability may refer to all of these matters. If the location information is not reliable enough, the service may not be provided to the mobile terminal.

Preferably the server receives and classifies location information from all of the location information sources. However, it may receive and classify location information from some or even only from one location source.

Preferably there is a plurality of different types of location information sources. For example, the location information sources may comprise electronic systems for determining location or may be a user of a mobile terminal providing the information. In an embodiment in which there are electronic systems, one or more of these may comprise GPS, Time of Arrival (TOA) or Estimated Observed Time Difference (EOTD) or a combination of these. EOTD is a mechanism for determining location in a radio access network (RAN) by appropriately processing radio network measurements. Alternatively the electronic systems may determine location information based on proximity to access points. Such a system may be based on BLUETOOTH or WLAN access points.

Preferably, the system has a selector for selecting location information from one particular location information source when location information from more than one location information is available.

Preferably the system comprises a location information handler to combine location information gathered from different sources. The location information handler may convert location information presented in different forms into other forms, for example to different logical location representations of the location information and especially to human-readable forms.

Preferably the location information handler comprises a location server. The location server may comprise a network location provider. The network location provider may provide a standard interface for the location server to get location information. The location information handler may comprise a location agent. The location agent may be located in a mobile terminal. The location information handler may comprise a positioning system to be used by at least one location agent.

Preferably the system comprises means for uniquely identifying the mobile terminals.

Preferably the system defines a service deployment area where the service is offered or provided or both.

Preferably the system comprises a profiling sub-system which keeps and/or compiles profiles related to one or more of a user, a mobile terminal and a service. For example the profiles may contain information selected from terminal capabilities, such as the model, its screen size, its connection speed, user characteristics, such as the user's gender, age and the category of user, for example whether a gold or a silver user, and preferences of the user selected list, such as expressed interest in music, clothes or electronics or other matters. The profiles may be used for comparison purposes. For example, service profiles may be compared against user and mobile terminal profiles for determine whether provision of such services to such a mobile terminal or a user is permitted or is possible. The user and mobile terminal profiles can be used to determine targeting of advertisements. Preferably, location information is used to determine targeting of services. This provides a high degree of customisation of services and advertisements.

Preferably the system comprises means for downloading of applications in mobile terminals. When activated, these applications may allow for the provision of certain services.

Since the system receives location information from a plurality of sources it provides a simplified interface for querying, thereby reducing the complexity and computing overhead of services.

The invention integrates the provision and management of services which makes it attractive for use in ISPs and network infrastructures, and with mobile terminals.

Preferably the system comprises a wireless communications system. It may comprise a cellular telephone network.

Preferably the system comprises a plurality of superimposed wireless systems. In one embodiment, there may be communications system and superimposed on it other systems. The other systems might be, for example, a positioning system such as GPS or local positioning systems in which position is determined from the ability to communicate with a local access point. The local positioning systems can also provided access points from which services may be obtained. Such an arrangement can present a series of overlapping areas in which communications and/or services are provided. In such a system, the invention is particularly useful in distinguishing the movement of mobile terminals inside such overlapping areas.

According to a second aspect of the invention there is provided a method for providing services to at least one mobile terminal comprising the steps of:

associating services with a plurality of service locations in an area the mobile terminal being moveable within the area;

providing location information from a plurality of location information sources indicating the location of the mobile terminal;

tracking the mobile terminal relative to the service locations so that the presence of the mobile terminal at a particular service location of a service can be determined;

receiving the location information and determining whether the location information from at least one source provides a basis for providing the service; and providing the service to the mobile terminal if there is basis.

According to a third aspect of the invention there is provided a computer program product comprising a computer readable medium having thereon:

computer executable code for defining a plurality of service locations in an area and associating services with the service locations;

computer executable code for receiving location information from a plurality of sources indicating the location of at least one mobile terminal moveable within the area;

computer executable code for tracking the mobile terminal relative to the service locations so that the presence of the mobile terminal at a particular service location can be determined;

computer executable code for determining whether the location information from at least one source provides a basis for providing the service; and computer executable code for providing the service to the mobile terminal if there is basis.

According to a fourth aspect of the invention there is provided a method for providing services to at least one mobile terminal comprising the steps of:

associating services with a plurality of service locations in an area the mobile terminal being moveable within the area;

providing location information indicating the location of the mobile terminal;

tracking the mobile terminal relative to the service locations so that the presence of the mobile terminal at a particular service location can be determined;

receiving the location information and checking profile information to select certain services to be provided to the mobile terminal;

providing a collection of the selected services to the mobile terminal so that they can be chosen by a user of the mobile terminal; and providing services to the mobile terminal which are chosen by the user.

Preferably the profile information is a user profile, a terminal profile or a service profile. It may be a combination of any or all of these. Preferably a service profile which defines a service deployment area is checked to see if the mobile terminal is in a location suitable to receive the service.

Of course, if only one service is selected, the collection will only comprise one service.

According to a fifth aspect of the invention there is provided a mobile terminal according to any preceding aspect of the invention.

BRIEF DESCRIPTION OF THE DRAWINGS

The invention will now be described by way of example only with reference to the accompanying drawings, in which.

DETAILED DESCRIPTION

Figure 1:
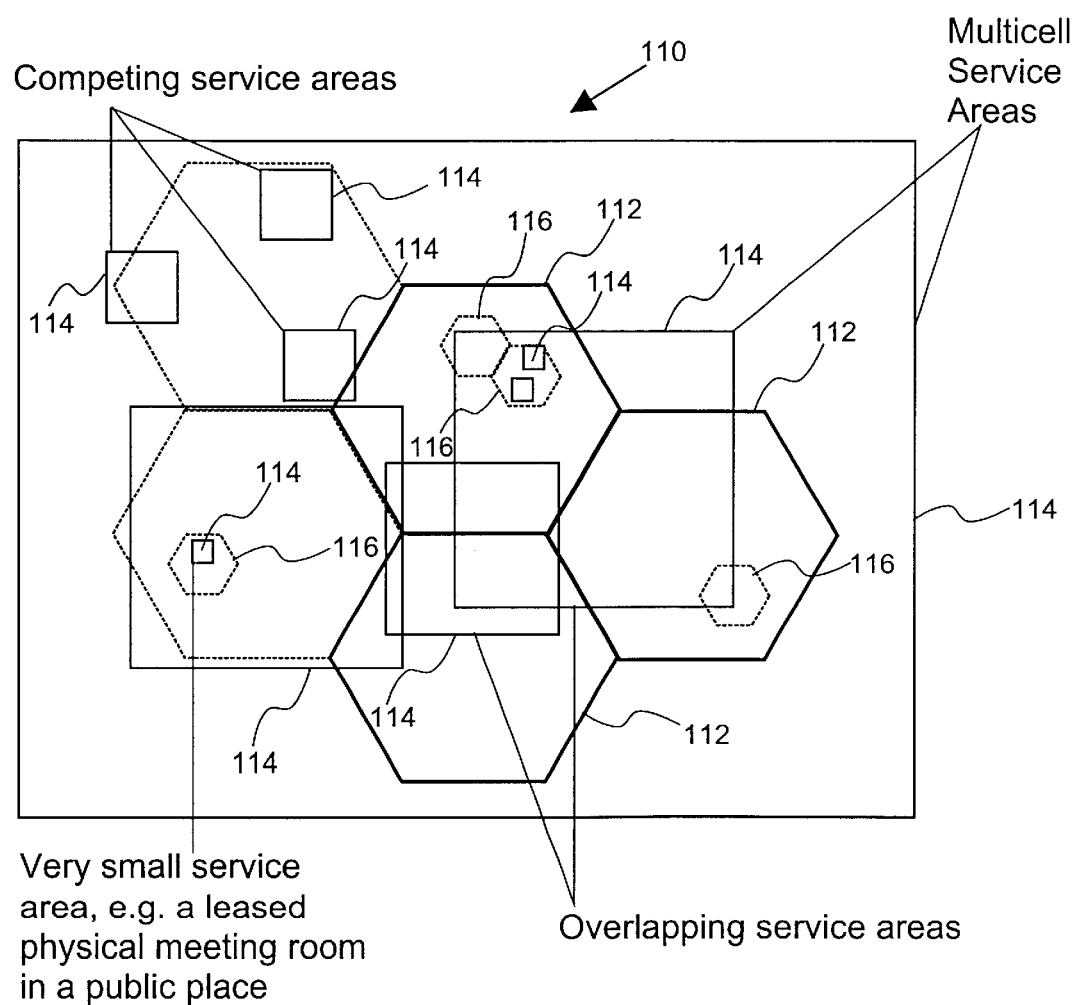
FIG. 1 shows a coverage area of a communications system.

FIG. 1 shows a coverage area 110 of a communications system. The coverage area has a plurality of routing cells 112 for routing of communications connections and a plurality of service deployment areas 114. These areas are defined locations within which a mobile terminal is to be provided with particular services. They can be defined in several ways. They may be a set of co-ordinates defining the physical boundary of an area, they may be an access point name or they may be a logical area such as an address or a floor of a building. A particular service deployment area 114 is calculated from the cell information obtained from a network location provider in the RAN. It may also be calculated from position obtained from a positioning system.

The service deployment areas 114 are generally contained within the routing cells 112. However, some of the service deployment areas 114 cover a number of routing cells 114 and thus overlap several routing cells 112. In addition, service deployment areas 114 may overlap with, or wholly contain, other service deployment areas 114.

The coverage area contains a number of WLAN hot spots 116 which provide network access for mobile users to obtain services. These hot spots may be located in, for example, airport lounges, shops and hotels, that is, in locations in which the public typically has need of services and where there may be considerable use of services.

Hot spots provide for provision of highly localised services. In the case of WLANs service deployment areas can be in the order of tens of meters, for example 25 to 100 meters across. They may provide services to customers in a specific room or floor in a building. Although this embodiment shows WLAN hot spots, in other embodiments, hot spots may be provided based upon a communications technology other than WLAN or a combination of different communication technologies.

Location can be expressed in terms of physical location, for example in the form of co-ordinates, and in terms of logical location, for example a street address. A street address is a logical representation of a space from the viewpoint of a user.

A logical location can be a useful way to express location. For example, the service may relate to using a printer in a room.

Physical location may be obtained from RAN cell information or a positioning system. Logical information may be obtained from a user or can be derived from physical location information. When logical location information is derived from physical location information, it is dependent on the latter's reliability. Equally, physical location may be derived from logical location.

When expressed in terms of co-ordinates, physical location information can readily be automatically computed. For example, distance calculations are simple to perform.

Figure 2:
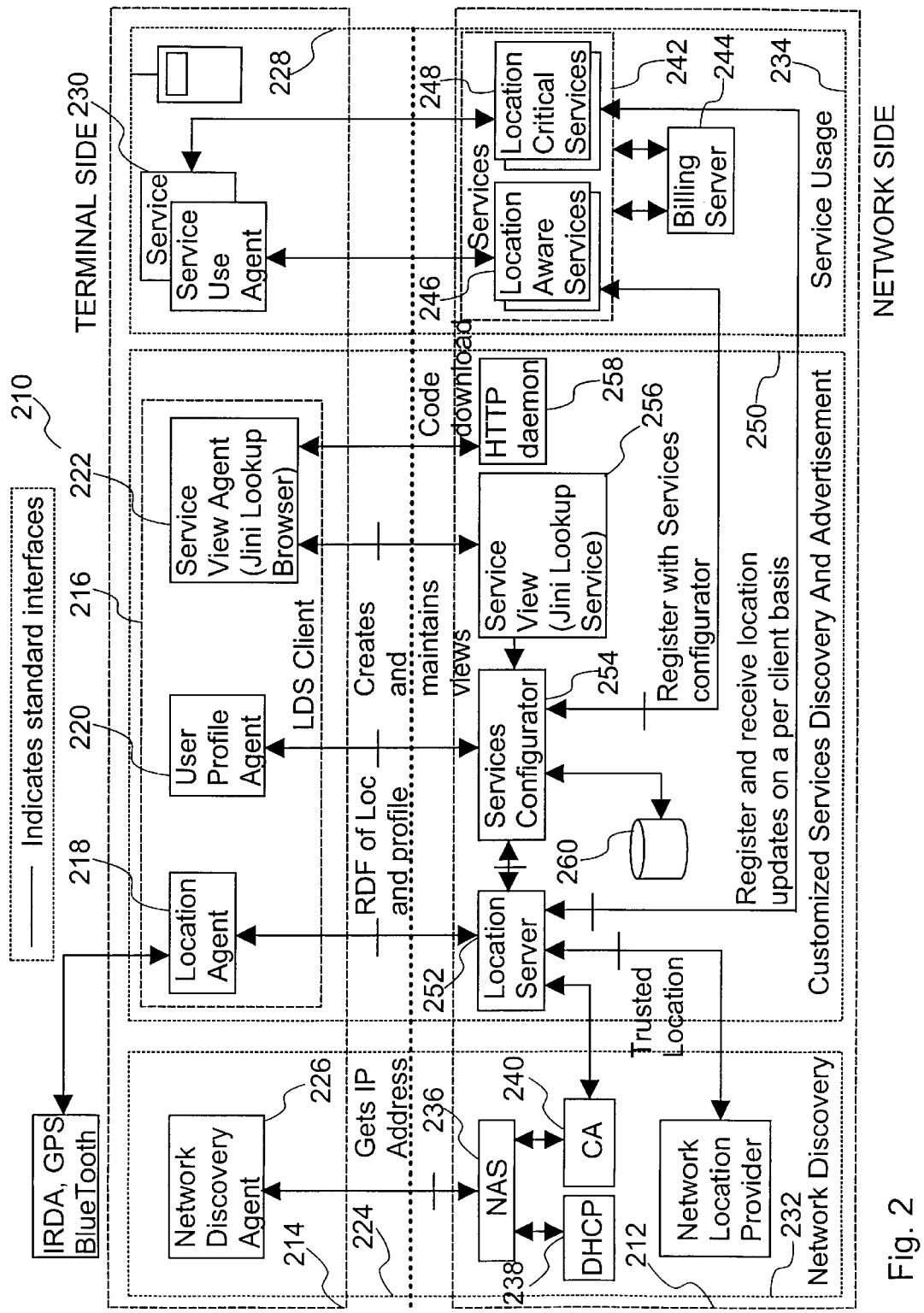
FIG. 2 shows a system for providing LDSs.

FIG. 2 shows a system 210 for providing LDSs to mobile terminals. It may be integrated in a mobile communications system and so may be located across the coverage area 110 of FIG. 1 with individual routing cells being defined by base stations of the system. The system 210 comprises a network 212 and a plurality of mobile terminals. For the sake of clarity, only one mobile terminal, designated as 214, is shown although more may be present. The mobile terminal 214 or mobile entity (ME) is carried by a user who is mobile across the coverage area 110 and wishes to access and use services provided by the network 212. It is to be understood that such services will include communications services although the following is particularly concerned with other kinds of services.

In addition to the provision of services, the system also controls advertisements sent by the network to mobile terminals. Since the user of the mobile terminal may not be aware in advance of services which are available, or which become available, advertisements are used to advertise the existence of specific services in specific locations to the user. This is done on-line. Advertisements may be sent to users as they are travelling along, for example walking along the street or travelling in a car, or may be sent when a user enters a particular location, for example a building or a particular part of a building.

In this embodiment, the network 212 is based on TCP/IP (that is transmission control protocol over Internet protocol). The ME 214 and the network 212 communicate by any suitable transmission technology, for example via the general packet radio service (GPRS). Therefore, a preliminary step to the service-related procedures set out in the following is that the ME 214 registers with the network 212 and obtains an IP address.

The system targets services to suitable mobile terminals or users by using profiles. Profiles are applied to the mobile terminal which is carried by a user, to the user (a personal profile) and also to a service. Different types of terminals have different capabilities for providing users with appropriate service user interfaces and content. This may be due to the media they are using and to other physical restrictions, such as size and power consumption. Among all possible services, only those suitable for a particular terminal are determined in order to make only useable services available to the user. This is called terminal profile matching. Services are targeted and made available to different categories of users. The users are mobile and they do not necessarily know which services are available at a particular location. Therefore, the user characteristics are examined and suitable services are targeted at them. This is called user profile matching. User profiles can also be used by mobile terminal users for searching other mobile terminal users according to the characteristics of these other mobile terminal users. This can be used to create ad-hoc communities, for service advertising, or for any other user queries. Service users may be interested in a subset of services among all those available. The users have preferences for service characteristics, they may have identified or subscribed as users of certain services and/or they may wish to avoid others. To enable this, the service characteristics are examined and users suitable to receive the services are identified. This is called service profile matching. Service characteristics, or service attributes, may include supported terminal types, supported terminal templates and personal templates.

The terminal profile enables the network 212 to determine if the mobile terminal is able to support a particular service that is to be sent. The user profile enables the network 212 to determine if the user of a particular terminal is a suitable target for any of the services provided by the network 212. If the service is location dependent, the service profile includes the location concerning the service deployment area where the new service is deployed, that is the area within which MEs are to have access to the new service. The service profile enables the network 212 to determine if the associated service should be targeted at particular terminals.

Examples of situations are set out below in which profile matching can be useful:

A service may be targeted at users with a particular profile indicating a particular activity, for example whether the user is at work, at leisure, on vacation, in a meeting, absent or busy.

A user may prevent particular services from being provided by indicating them in a list of avoided services.

A service may be targeted at users depending on whether they are younger and/or older than specified age limits.

A service may be targeted at users of a certain profession.

A service may be targeted at users whose terminal is of a type among the types supported by the service.

A service may be targeted at users depending on whether their terminals have either a graphical or a textual display.

A service may be targeted at users with a keyboard and/or a mouse available on their terminals.

A service may be customised for a certain web browser, for a certain operating system, terminal manufacturer and/or for model, thus targeted at use on a terminal matching such criteria.

A service, particularly advertising, may be targeted at users having a particular gender.

A service may match a user's employer to determine whether the user has a corporate customership to the service. Business certificates can be used to certify the service and the users.

A service may be customised for users in a certain department within a certain employer.

A service may be targeted at users with terminals being able to understand certain multi-media (for example voice) formats in order to be useable on a user's terminal.

A service may be targeted at users with terminals with a minimum screen size and/or a colour/monochrome display in order to be utilised on it.

The use of profiles in the system will be explained in the following.

The ME 214 provides a user identifier to the platform to identify the user. If only one user uses the ME 214, this user identifier may be the same as a terminal identifier which identifies the ME 214. If there are several users using the same ME 214, or sharing an equipment or an account identifier, the user identifier may discriminate between these users. Such an identifier may be provided by a smart card or a comparable trusted device enabled for digital signing.

The mobile terminal comprises an LDS client 216. This is pre-installed minimal client software in the ME 214, which interacts with the network 212. The LDS client 216 comprises a location agent 218, a user profile agent 220 and a service view agent 222.

The location agent 218 is able to obtain location information from a number of sources before it is passed on to a location server 252 (which is described later). Location information provided by the ME 214 is generally considered to be not particularly reliable, although it may be sufficient for certain services. The ME 214 may provide location information which has been obtained from an external positioning system (such as GPS) Location information may be derived from knowing the location of a particular IRDA (Infra-Red Data Association) or BLUETOOTH access point which the ME 214 is communicating with. It may be provided by radio tags. It may be provided by a user in the form of logical location information.

Different sources of location information have different reliabilities. In general, information provided by the mobile terminal may not be trusted. This is especially likely if privacy and money are relevant to the service. Therefore, it is desirable that the RAN provides a basic mechanism for getting location information. In this case, the location information is provided to the location server 252 by a location information source in the network. This may be an indication of an individual cell in which the ME 214 is located or, more preferably, provided from a network location provider, for example operating by TOA/EOTD estimations. Equally, it may be provided by a WLAN access point communicating with the ME 214 which is able to confirm to the network 214 where the ME is located. The mapping between physical locations, that is, co-ordinates and spaces and different forms of logical locations, for example those comprehensible to humans, is done in the location server 252. The network is generally considered to provide the most reliable location information.

Whatever the source, that is whether from the network 212 or the ME 214, the accuracy of the estimated physical location varies with the different methods used (GPS has an accuracy of tens of meters and TOA/EOTD has an accuracy of hundreds of meters) and with location environment conditions (GPS does not work very well indoors, cellular coverage may have poor coverage in places and accuracy problems may exist related to bad multi-path, poor line-of-sight (LOS) availability and may be derived from the last known location of an idle mobile terminal in a location area).

It should be understood that all of the available sources of information are not alternatives but present a pool from which the system can choose. Although all of the possibilities mentioned might not be present, if two or more location information sources are available, they are aggregated and stored in the location server 252. In this way the best, or most appropriate, source of location information may be used. For example, in the case of a call made by the user to an emergency service, although the network can establish the origin of such a call using TOA/EOTD calculations, more accurate information may be desired, in which case other sources of location information may be used, for example GPS (if it is available). In other words, the system is able to use location information to track a user/ME 214 to a sufficient or greater level of accuracy.

When the location information is received by the network 212, particularly by the location server 252, location meta-information is attached, indicating its source and the time of its receipt. Sources of location information are classified and each individual location information is assigned an identifier indicating the source. The time is given in the form of a time stamp. The meta-information is attached so that a service can assess the reliability of the location information. This involves the trustworthiness of a source, its accuracy or precision and its timeliness (older location information might be less reliable). The meta-information may be compiled so that it is in the form of a "reliability and precision index". This index value used can be agreed between the network operator and service providers and then the service providers can specify in connection with their services whether some reliability is required and the necessary level of index value.

The user profile agent 220 provides characteristics of the ME 214 which may be relevant to the provision of services. It also provides the preferences which have been recorded by the user. Such user preferences may even be pre-set, for example by a network operator depending on the level of service which has been paid for. These preferences are stored in the ME in a standard format (such as Resource Description Framework (RDF), a meta-data architecture for the World Wide Web).

The service view agent 222 provides the MEs 214 with the capability to browse services on the network 212 presented in the form of service views. A service view is a dynamically created repository of service handles for each ME connected to the network. In short it represents the "set of services applicable to a user in a particular location". The service profiles and their attributes are stored, in the form of templates, in a service directory which is simply a collection of the service profiles. The service view agent 222 is a client side of a publish-subscribe model of communication having service views. "Publish-subscribe" means that the service configurator publishes the services to the user using the service view, and the ME user is free to subscribe to any of the services offered.

In the event of a service being selected by a user, if software is necessary to carry out the service, the service view agent 222 interacts with the network's HyperText Transfer Protocol (HTTP) server or daemon (HTTP daemon 258) to download client side code of services, that is downloading of software to an ME to be used in provision of a service, in the form of a service use agent (discussed below). Typically this is in the form of one or more Java applets. When a user connects to a service web site, a piece of software is downloaded to an ME Web browser, which then automatically runs the software in a Java Virtual Machine in the browser. This program execution may then connect to a Web server site and collaborate with the server software there to provide the user with the service.

The ME 214 also comprises a network discovery part 224 comprising a network discovery agent 226 and a services usage part 228 comprising service use agents 230.

The network 212 comprises a network discovery part 232 and a service usage part 234, each of these parts operating with corresponding parts in the ME 214. The network discovery part 232 of the network 212 comprises network access service (NAS) 236, a dynamic host configuration protocol (DHCP) server 238 and a certification authority (CA) 240. The NAS 236 is the known contact point for an ME network discovery agent to contact to and establish a connection with a network. When an ME 214 has discovered a network by connecting to the NAS 236 (this happens in a way which is dependent on the RAN), it gets from the DHCP server 238 an IP address for itself and the IP address of the Directory Service (DHCP is also responsible for providing the ME with other parameters to configure an Internet connection). Reliable service-client (ME) relationships cannot be established without authenticating both the client and the service to each other. The CA 240 provided by the system facilitates this by acting as a trusted third party.

The service usage part 234 of the network 212 comprises LDSs 242 which are active in the network 212 at a particular time and a billing server 244. The billing server is active for certain services which carry a charge.

The LDSs 242 include location aware services 246 and location critical services 248. The location aware services 246 may be initiated when a ME 214 is in a particular location, but do not need to be terminated when the ME 214 moves away from that location. The location critical services 248 are only provided when the ME 214 is present in a particular service deployment area 114 and must be terminated once the ME 214 moves out of that area. This occurs when the location server 252 publishes a departure indication or an "out of zone" event which is received by the location critical services 248. Departure indications may not be an essential part of the service as the messaging overhead may be quite significant if a new session key has to be made and distributed. The LDSs 242 receive up-dates of location information as will be described below.

Location independent services, such as any of the other services available in the World Wide Web, may also be provided. These location independent services are not shown in this Figure.

The network 212 also comprises a customised services discovery and advertisement part 250 which co-operates with the LDS client 216. The services discovery and location part 250 of the network 212 comprises a location server 252, a service configurator 254, a service view 256 and the HTTP daemon 258. The service configurator 254 has associated with it a service repository 260 which contains the actual services which service providers have registered with the network 212. The service directory is a database of the service repository 260. The service configurator 254 connects to, initialises and launches the services 242 in the addresses in the service entries, activating them in the network 212 for the MEs 214.

Services are registered with the network 212 at the request of a service provider. The service provider negotiates with the service configurator 254. Before a service can be registered, the service configurator has to authenticate the service provider. This is to confirm to the ME user that all services presented to him are legitimate. After authentication, the service configurator 254 is provided with a service entry for that service, including among other characteristics the type of service provisioning to be used, that is whether the service is a pushed one, whether it requires downloading of code, whether it is connected to by a ME, or whether it has to be launched in some remote service host. The service profile is provided for profile matching to enable service advertising to suitable MEs and user target groups and to enable users to find suitable services. Profiles are used so that services can be offered via service views in a spontaneous way to users without being specifically requested. This is useful since the user may change location and the available services may change automatically in response.

The location server 252 receives and maintains the current location information of the MEs 214 in the coverage area 110 of the network 212. Location information is stored, passed on and expressed using Resource Description Format (RDF) and Extensible Markup Language (XML). The location server 252 uses the location information to compute the location of the ME 214 within the coverage area 110. The location server 252 determines the boundaries of service deployment areas 114 of LDSs from information provided by service providers. It maps the location of the ME 214 to service deployment areas 114. The service is thus provided with location information and an indication of its precision, and the service decides whether to transact the service with the ME 214 based upon the precision and reliability of the location information. This depends on the location meta-information. Each service may specify a policy and practises for using the meta-information. In a situation in which service deployment areas overlap, the location of the ME 214 may be mapped to more than one service area.

The location information is used to generate location up-date events to services in the network to indicate movement of MEs 214 into and out of service deployment areas 114, respectively "in zone" and "out of zone" events. This is useful in the case of overlapping service deployment areas 114 since this information can be used to track MEs 214 and thus up-date the services which should be targeted at them. Therefore, since the location server 252 tracks the MEs 214, only these significant events need to be provided for external use outside of the location server 252, for example in the service configurator 254.

The location server 252 may interact with suitable Authentication, Access Control and Accounting (AAA) to validate the location information. AAA is needed in the system to support those functions for use of LDSs via MEs. Smart cards may be used as a means for authenticating the user. In the architecture, a certificate authority (CA) is used to implement AAA.

The service configurator 254 customises services which are presented to MEs 214. It interacts with the LDS client 216 and plays a key role in the advertisement of services. Its functions are:
- receiving registrations from services;
- receiving service queries from MEs 214;
- obtaining ME location information from the location server 252;
- interrogating the service repository using key parameters, such as location, terminal and profile, to find the set of services applicable to this ME and creating a customised service view;
- advertising new services to registered MEs together with service views; and
- resolving the actual user profile to be used in determining the service view to be used.

When a new service view is created, the service configurator 254 provides its handle to the ME 214. The service views can be populated by the service configurator 254 with new service handles as and when new services are added, provided that the profile of the service matches that of the ME/user for whom the service view was originally created.

Within the services discovery and location part 250 are the parts of the system which operate as a notification framework in order to informs MEs of new network services that are available in their proximity. The notification framework is a sub-system within the system described above. In this context a notification may include service information such as service attributes, a service handle and a uniform resource locator (URL) from which the client part of a service (corresponding to the service use agent 230) may be downloaded. Notifications may contain less information, for example URLs with text which explains their nature to the user or advertisements in the form of pure text which can be displayed without any further addition to the service view on the client side being necessary. An ME 214 needs to receive a notification before it is able to establish a relationship with a service. Once the relationship is established, the ME 214 and the service can communicate directly. This means that service providers are not able to push services onto the MEs 214 and that the service configurator 254 is involved in the provision of services and thus controls the services which are provided.

Figure 3:
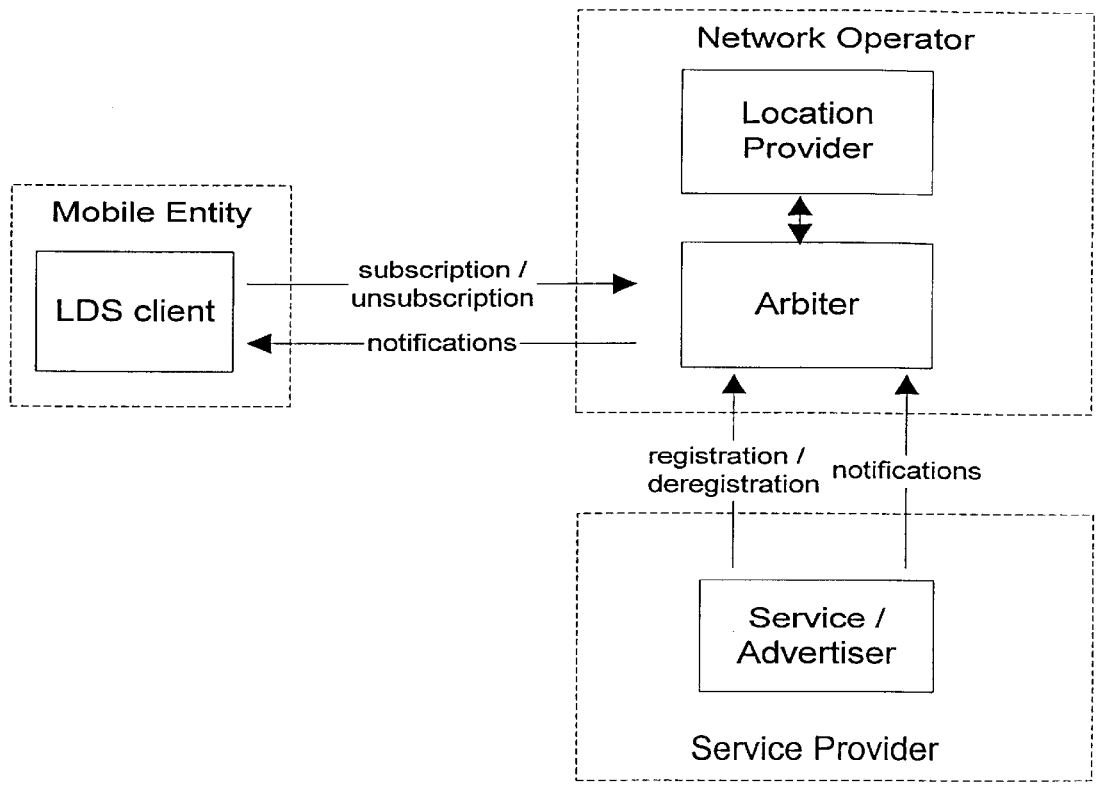
FIG. 3 shows a notification framework.

The notification framework is shown in FIG. 3 and comprises a subscriber, represented by the LDS client 216 embodied within an ME 214, communicating with a network operator and subsequently a service provider. On the network side is an arbiter and a location provider. The arbiter corresponds to the service configurator 254 of FIG. 2 and has access to services which have already registered with the system. As explained above, these are stored in the service repository 260. The location provider corresponds to the location server 252 and its sources of location information (whether these are from the network or from the ME 214).

Combining the notification and the service query minimises network traffic.

At start-up, when the ME 214 makes its first connection to the network 212, it also sends a query containing the profiles of the user and of the ME 214 to the network 212. The query is received by the arbiter. The location agent 218 provides location information concerning the location of the ME 214 with the query and it is received by the location server 252 of the network 212. This is necessary for the ME 214 to be able to get LDSs, that is, the arbiter may check in which locations users are located and direct relevant notifications only to those MEs in certain locations.

The service configurator 254 uses profile matching to create a service view of services applicable to this particular ME and the user profile. This involves the service configurator 254 looking at service profile and deployment service information from the service repository 260 and then identifying those services which correspond to those of the user profile. In addition, the service profile and terminal profile are reviewed to provide a particular range of services which are compatible with the particular terminal and the user. These services are then provided (delivered) to the ME as a service view from which it is accessible by the service view agent. The service configurator 254 then determines which services match the user profile and are geographically suited to the location of the ME 214.

The service configurator 254 then sends a service view handle to the LDS client 216. The service view handle is an identifier of the set of applicable services that has been negotiated by the service configurator 254 as complying with the user, ME and service profiles of the user, ME 214 and the services. By using the service view handle, the service view agent 222 can browse the service view 256 and thus present available services to the user via the ME. The notification framework updates the service view to the ME each time it changes on the network side. Thus the updates are automatic.

Figure 5:
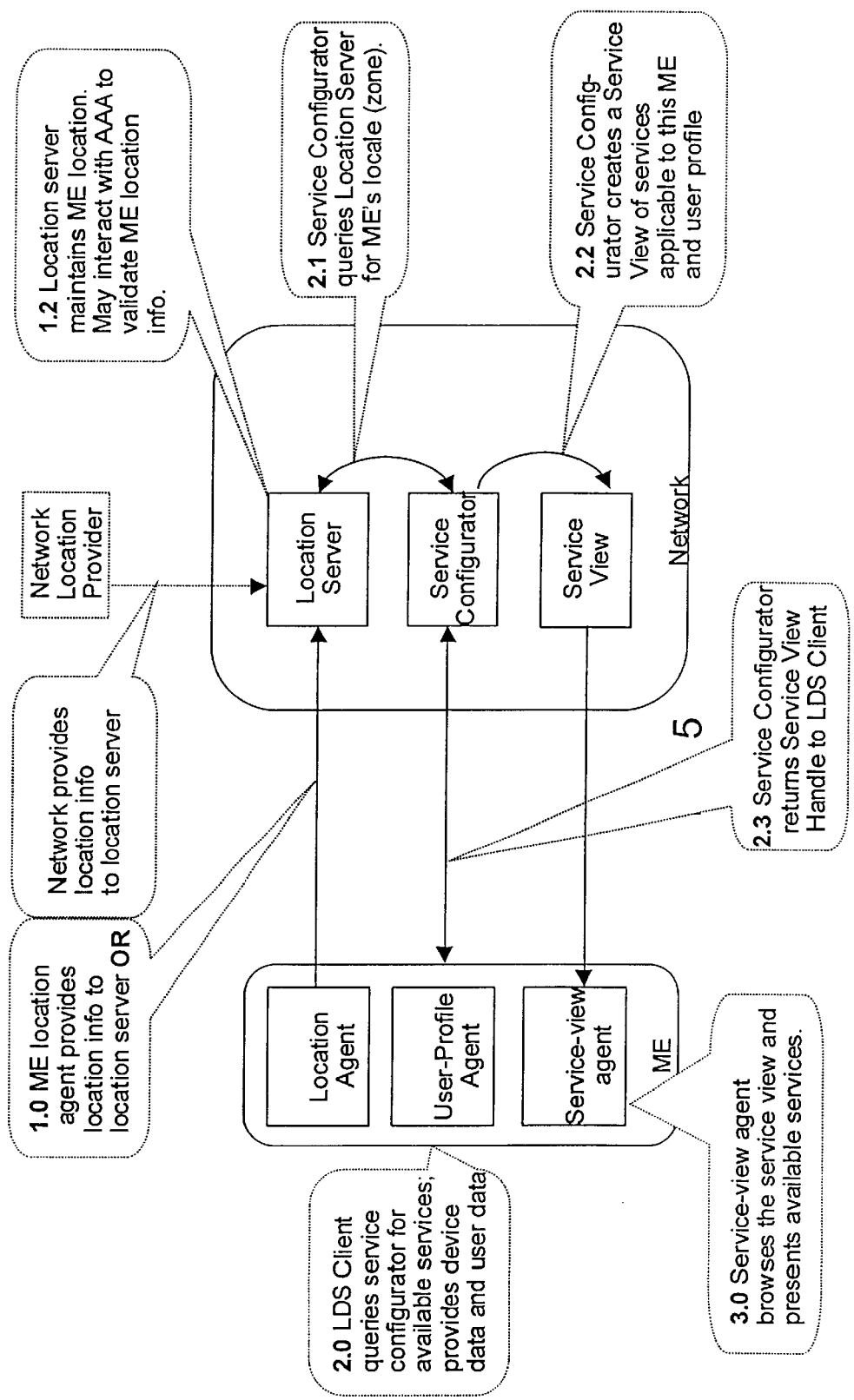
FIG. 5 shows the provision of services.

This is operation is shown in FIG. 5.

There are a number of ways in which the services available to the user/ME 214 can change following those made available at start-up. New services can become available when an ME 214 moves into another service deployment area. As the ME 214 moves, it sends location information concerning its new location to the location server 252 of the network 212. The location server 252 tracks the ME and, using its information about the boundaries of service deployment areas, it informs the service configurator 254 when the ME moves from one service deployment area to another. The service configurator 254 checks the new location against the services in its service repository 260 and identifies those which are newly available (assuming that there is a match between the profiles of the user/ME and the service). These new services are added to the service view which then provides a remote up-date event to all of its MEs 214 which have subscribed for up-dates of services. The service view agent up-dates its view so that the user can see the current range of available services. Since service deployment areas can overlap, it is possible that the ME 214 may move into a new service deployment area whilst remaining within the boundaries of its original service deployment area.

Figure 6:
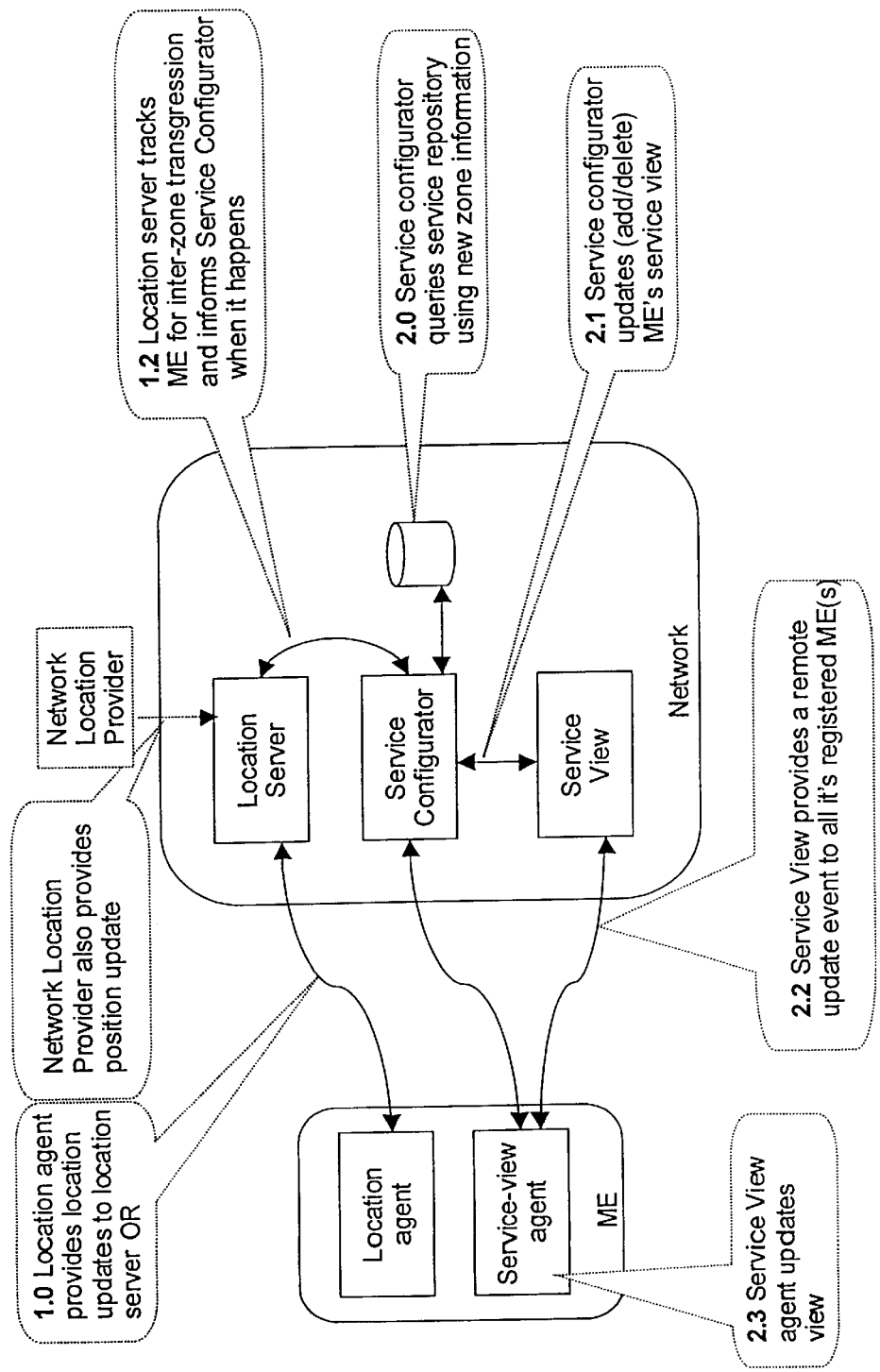
FIG. 6 shows the provision of services.

This operation is shown in FIG. 6.

If the ME gives imprecise information about its location, then it does not receive LDSs relevant its actual location, but instead receives LDSs relevant to another area. Therefore, it is desirable for the ME to give correct (and possibly accurate) information. On the other hand, if a service require reliable location information in order to provide a service, the service uses information, whose source is in network, rather than in the ME 214.

It should be remembered that in moving, the ME 214 may move out of its current service deployment area. In this case, the service configurator 254 uses the new location information and refers to its service repository 260 to determine that certain LDS are no longer available. Accordingly, the service view is up-dated, and the services can thus be used by the user referring to the service view agent.

Instead of the ME entering or leaving a service deployment area, the service can enter or leave the network by being registered or de-registered. It is to be understood that entering or leaving a service deployment area can occur as a result of physical movement of an ME or it can occur if the ME is switched off and its connection to the network 212 is broken.

At start-up or at any later time, the ME 214 can make a subscription. The subscription includes reply address, lease time and advertisement wish lists giving user preferences of the categories of advertisements which the user would like to receive, for example those concerning music, clothes, restaurants and hotels. This means that the user will receive a service view update and receive details of additional, that is new, services which become registered in the network 212. When a new service is registered with the service configurator 254 it activates the new service so that it is invoked and active (in services 242) in the network 212. The system then follows a procedure similar to that above in order to modify the service views for the MEs although the procedure is only applied to those MEs which have subscribed for up-dates of services. The service configurator 254 adds the new service to its service repository 260. The service configurator 254 then provides to the location server 252 service deployment area information. The location server 252 uses the deployment area information to determine which subscribing MEs are currently located in the service deployment area. This information is then forwarded to the service configurator 254. The service configurator 254 checks the subscribing MEs, and selects those whose user profiles match the service profile of the service which has been registered. It then up-dates the service views 256 of those MEs which have a matching profile and are currently located in the new service deployment area. The new service is given a service view handle. The service view 256 then sends an up-date event to the service view agent 222 of the ME. The service view agent 222 then up-dates the service view. Services for an ME are grouped together under one handle.

Therefore, in a system according to the invention, the arbiter sends a notification relating to the new service individually to those MEs 214 which have subscribed and are in an appropriate location. This happens without the MEs needing specifically to request such a notification and so can occur without the MEs needing to poll the network frequently for such notifications.

Figure 7:
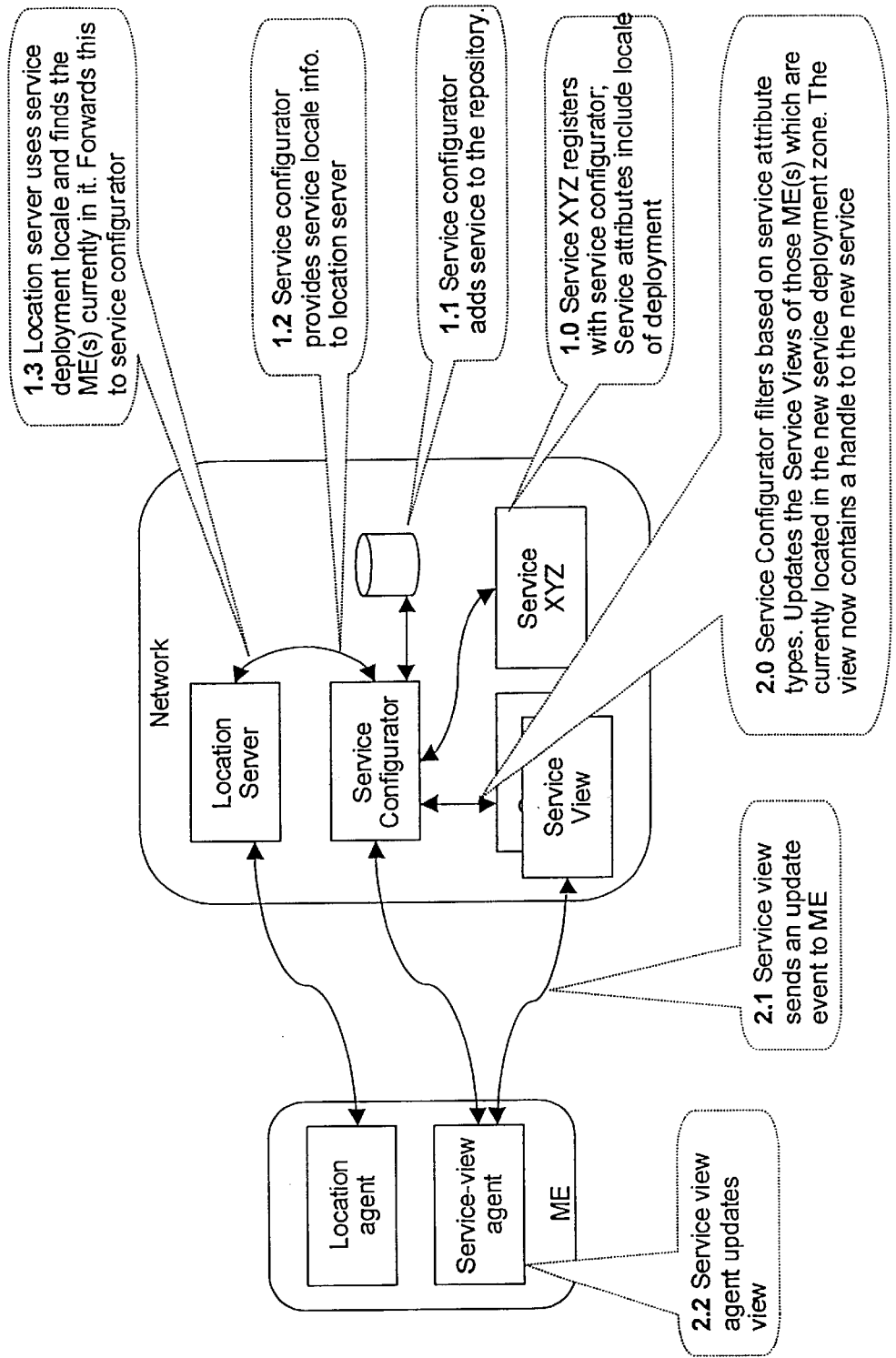
FIG. 7 shows the provision of services.

This is operation is shown in FIG. 7.

Notifications connected to services (including advertisements) are passed through, and are thus controlled by, the arbiter.

If subscriptions to services have an associated lease time, they have to be renewed before the lease time expires. Renewal of subscription may contain a different advertisement wish list. In addition, service providers may renew their registrations of services at any time with different attributes including suitability for particular terminals according to their physical restrictions (such as size, power consumption), different capabilities for providing the user with appropriate service user interfaces and content and target user characteristics. It may, of course, also contain details of a new location.

Conversely, services may be unsubscribed by the ME user modifying avoided services and advertised services attributes in the user profile. Those changes are reflected in the results of profile matching done to find applicable and advertised services for the user. This requires the subscriber to send an unsubscribe message to the arbiter. The unsubscribe message indicates the service, services, advertisement or advertisements which are no longer required. The subscriber is then removed from the arbiter in relation to certain services or advertisements.

Registration of a new service can happen at any time, at the request of a service provider. The registration procedure described above is followed and, if suitable, the service is registered and a service entry is installed in the service repository 260.

In addition to registration of services, advertisers may also be registered as an advertising service to the arbiter. The arbiter may authenticate the registration to confirm the identity of an advertiser. This is especially relevant if a banking service is being used. The advertisements sent by the advertiser to the arbiter may have certain attributes. The arbiter may then check the list of subscribers and select those whose profiles match the attributes. The arbiter then sends the advertisements only to suitable subscribers. Although the advertisement may be stored in the arbiter, it is preferred that it is simply forwarded on to subscribers.

Services may also be de-registered at the request of the service or the service provider. The service is removed from the system and a de-registration message is sent to the arbiter. The service is then removed from the arbiter database. This also applies to advertisements.

The notification framework allows the MEs to discover network services without actively searching for them. It also enables service providers to advertise their services in a controlled way.

Figure 4:
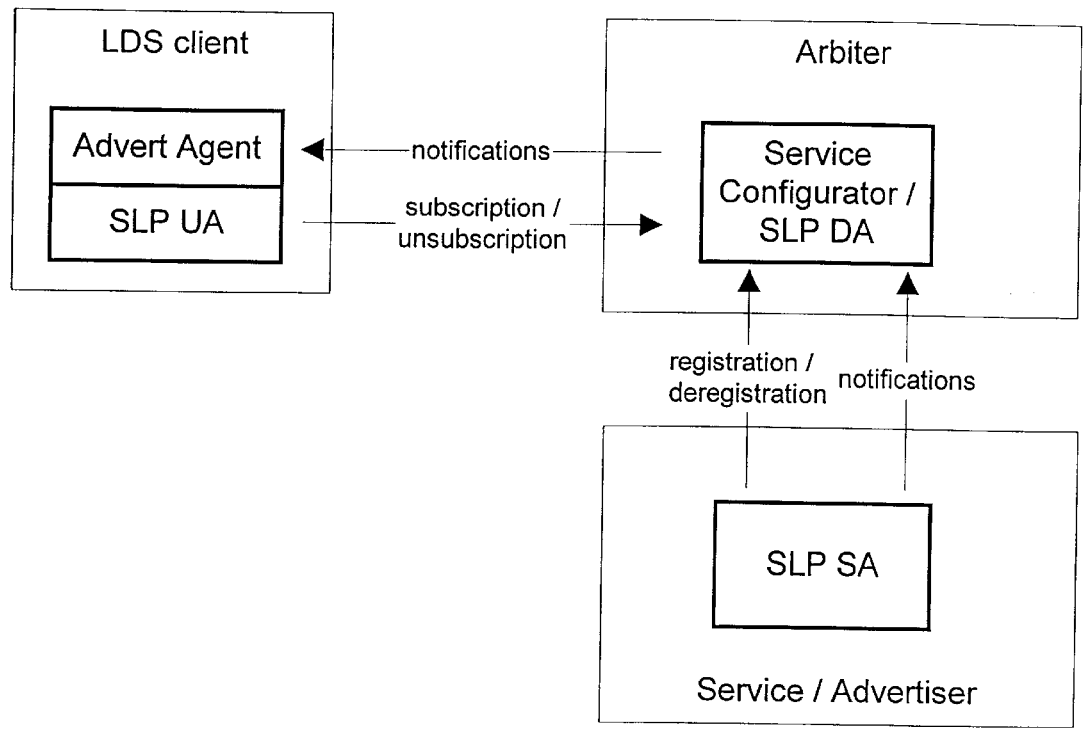
FIG. 4 shows an embodiment of the notification framework of FIG. 3 in SLP.

In one embodiment of the invention, the notification framework is applied as an extension to the SLP. SLP provides a way to store network service registrations and clients to retrieve these registrations on demand. In its known form, the SLP does not provide notifications but instead relies on frequent polling. FIG. 4 shows an SLP extension implementation according to the invention. FIG. 4 shows the features of an SLP implementation applied to the notification framework of FIG. 3. The arbiter is implemented by an SLP directory agent (DA) having a service configurator 254. The DA keeps a directory of network services and subscribers and is the primary connection point for the registration of services and the look-up of services. The extension implements the notification functionality discussed above. On the subscriber side, the SLP user agent (UA) provides the service query mechanism. This is extended by an advertisement agent in the ME 214. The advertisement agent, which is conveniently part of the user profile agent 220, handles the user registration to the network and monitors service advertisements or announcements, which includes capabilities to gather user/terminal profiles. It sends this information as a subscription to the service configurator/SLP DA. The subscription includes the reference back to the subscriber, so that the service configurator may reply back to the subscriber by uni-cast. The advertisement agent is also capable of listening to the advertisements sent from the service configurator.

The service has the standard SLP service agent (SA) to register itself to the service configurator 254. If the service wants to send commercial advertisements, it has to register itself as an advertiser to the service configurator 254. After that, it may send regular advertisements (for example URLs to its web pages) through the service configurator 254. The service configurator 254 is able to authenticate the advertiser so that a hostile service is not able to flood the network with advertisements. Furthermore, the validity of services can be confirmed.

The notification information can be delivered with standard SLP messages or in message extension fields.

In another embodiment, the implementation uses Java-based Jini connection technology. The components are implemented with Java and they communicate with each other using internal protocols provided by Java.

Whichever embodiment is used, service providers must send their notifications of new services via the arbiter or the service configurator 254. It is only after a service has been subscribed to by the ME 214, that there can be direct communication between the service and a service use agent established on the terminal side. Advertisers do not have a direct connection to the ME 214 and must communicate via the arbiter or the service configurator 254. Therefore, the arbiter or the service configurator 254 is able to authenticate advertisers and control advertisement traffic in the network 212. Since the arbiter or the service configurator 254 matches profiles and knows the addresses of individual MEs which are interested in particular kinds of services and advertisements, it is not necessary for multi-cast to be used for notifications and uni-cast notifications can be sent directly to relevant MEs 214. The system is able to support location based advertisements as the arbiter or service configurator 254 can check the location of subscribers (MEs) and attach this information to the subscription. The advertisements can then by directed to a certain location and sent only to those subscribers which are in that location.

Although the system is largely based on actual location, provided by a suitable location information source, for example as a ME 214 attribute, it does not always need only to rely on such "real" location information. Since users may be able to foresee their future locations, this information can be provided to the network 212 and the network may provide a service to a mobile terminal at a future location. In this event, it may be necessary to specify a time at which the user/ME 214 will be present at this location. The system may be able to check from another information location source at this time whether the user/ME 214 is actually in the specified location and decide whether to provide the service.

The system can use different sources of (location) information, but provides the users (MEs, their users and LDSs) with a common interpretation of the information from different sources facilitating the use of this information.

Although the system carries out profile matching to build up a list of services in the service views, a user may customise these services by having them ordered, by certain (possibly location-dependent) criteria, selecting the best according to certain (possibly location-dependent) criteria, and narrowing the choice by additional (possibly location-dependent) conditions for the service location. For example a selection among multiple printers by a mobile user may lead to selecting a printer close to the user's anticipated destination. A fast moving user may wish to select a VoIP (voice over IP) service with the largest service area among the ones available. In this way, the user may be presented with a list of services which satisfy his user profile and then select from them based on his own additional preferences.

The invention provides an architecture for location based service discovery which simplifies the deployment and maintenance of LDSs on wireless based data networks, for example IP-based, over any access technology.

The system is able to support billing since the arbiter is able to authenticate the service providers and the advertisers and to monitor provision of services and sending of advertisements. This provides an especially convenient way of generating advertising revenue.

It should be understood that although the foregoing describes tracking of mobile terminals, such tracking is not always necessary. Therefore, an authorisation mechanism is provided to allow the mobile terminal to be tracked only if it has activated a service that needs to know its location.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

What is claimed is:

1. A system for providing services to at least one mobile terminal comprising:
    an area containing a plurality of service locations to which services are associated, the mobile terminal being moveable within the area;
    a plurality of location information sources to provide location information indicating the location of the mobile terminal, at least one of the location information sources being logical location information and at least one of the information sources being physical location information;
    a tracker for tracking the mobile terminal relative to the service locations so that the presence of the mobile terminal at a particular service location of a service can be determined;
    a location information handler capable of converting location information between logical location information and physical location information; and
    a server for receiving the location information and determining whether location information from at least one source provides a basis for providing the service.

2. A system according to claim 1 which the server determines that location information from more than one source provides a basis for providing the service.

3. A system according to claim 1 in which a classification is applied to the location information which indicates the reliability of the location information.

4. A system according to claim 3 in which the server receives and classifies location information from all of the location information sources.

5. A system according to claim 1 in which a selector is associated with at least one service which determines whether to provide the service.

6. A system according to claim 1 in which there is a plurality of different types of location information sources.

7. A system according to claim 1 in which the location information sources comprise at least one electronic system for determining location.

8. A system according to claim 1 in which the location information sources comprise information being provided by a user of the mobile terminal.

9. A system according to claim 1 in which at least a source of location Information is selected from a list consisting of GPS (global positioning system), Time of Arrival, Estimated Observed Time Difference and proximity to access points.

10. A system according to claim 9 in which the source of location information is based on proximity to IRDA transmitters, radio tag transmitters, access points of BLUETOOTH communication protocol or WLAN access points.

11. A system according to claim 1 which comprises a location information handler to convert location information presented in different forms into different logical location representations of the location information.

12. A system according to claim 11 in which the location information is converted into a human-readable form.

13. A system according to claim 1 which comprises means for uniquely identifying the mobile terminals.

14. A system according to claim 1 which comprises a profiling sub-system which keeps and/or compiles profiles related to one or more of a user, mobile terminal and a service.

15. A system according to claim 14 in which service profiles are compared against at least one of a user and a mobile terminal profiles to determine whether provision of services to such a mobile terminal or a user is permitted.

16. A system according to claim 14 which comprises means for downloading applications into mobile terminals in order to provide certain services.

17. A system according to claim 1 which comprises a plurality of superimposed wireless systems.

18. A system according to claim 17 in which there is communications system having a positioning system superimposed on it.

19. A system according to claim 1 which comprises a wireless communications system.

20. A system according to claim 1 which comprises a cellular telephone network.

21. A mobile terminal for use in a system according to claim 1.

22. A computer program product comprising a computer readable medium having thereon:
- computer executable code for defining a plurality of service locations in an area and associating services with the service locations;
- computer executable code for receiving location information from a plurality of sources indicating the location of at least one mobile terminal moveable within the area, at least one of the location information sources being logical location information and at least one of the information sources being physical location information;
- computer executable code for tracking the mobile terminal relative to the service locations so that the presence of the mobile terminal at a particular service location can be determined;
- computer executable code for determining whether the location information from at least one source provides a basis for providing the service;
- computer executable code capable of converting location information between logical location information and physical location information; and
- computer executable code for providing the service to the mobile terminal if there is basis.

23. A method for providing services to at least one mobile terminal comprising the steps of:
- associating services with a plurality of service locations in an area the mobile terminal being moveable within the area;
- providing location information from a plurality of location information sources indicating the location of the mobile terminal, at least one of the location information sources being logical location information and at least one of the information sources being physical location information;
- tracking the mobile terminal relative to the service locations so that the presence of the mobile terminal at a particular service location of a service can be determined;
- converting location information between logical location information and physical location information;
- receiving the location information and determining whether the location information from at least one source provides a basis for providing the service; and
- providing the service to the mobile terminal if there is basis.

* * * * *